US012651425B2

(12) United States Patent (10) Patent No.: US 12,651,425 B2
Ko et al. (45) Date of Patent: Jun. 9, 2026

(54) IMAGE PROCESSING METHOD OF MULTI-DIMENSIONAL REGION OF INTEREST IN WIRELESS CHARGING SYSTEM, AND COMPUTING APPARATUS PERFORMING THE METHOD

(71) Applicant: Electronics and Telecommunications Research Institute, Daejeon (KR)

(72) Inventors: Gwangzeen Ko, Daejeon (KR); Sang-Won Kim, Daejeon (KR); Seong-Min Kim, Daejeon (KR); Jung Ick Moon, Daejeon (KR); In Kui Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 407 days.

(21) Appl. No.: 18/348,106

(22) Filed: Jul. 6, 2023

(65) Prior Publication Data

US 2024/0257489 A1 Aug. 1, 2024

(30) Foreign Application Priority Data

Jan. 30, 2023 (KR) ........................ 10-2023-0012124

(51) Int. Cl.
*G06V 10/25* (2022.01)
*G06V 20/52* (2022.01)

(52) U.S. Cl.
CPC .............. *G06V 10/25* (2022.01); *G06V 20/52* (2022.01)

(58) Field of Classification Search
CPC ............................... G06V 10/25; G06V 20/52
USPC ......................................................... 382/103
See application file for complete search history.

(56) References Cited

U.S. PATENT DOCUMENTS

| | | | | |
|---|---|---|---|---|
| 9,893,538 B1 * | 2/2018 | Bell | ......................... | H04N 5/63 |
| 2012/0105634 A1 | 5/2012 | Meidan et al. | | |
| 2019/0393710 A1 | 12/2019 | Kim et al. | | |
| 2020/0047623 A1 * | 2/2020 | Zadrozny | ................ | H02J 50/90 |
| 2021/0086643 A1 * | 3/2021 | Satheesh Babu | ....... | B60L 53/14 |
| 2022/0103020 A1 | 3/2022 | Moon et al. | | |
| 2023/0336034 A1 * | 10/2023 | Ward | ...................... | H02J 50/10 |

FOREIGN PATENT DOCUMENTS

| | | |
|---|---|---|
| JP | H10-079934 | 3/1998 |
| JP | 2019-201268 | 11/2019 |
| JP | 2020-201180 | 12/2020 |
| KR | 10-2016-0011523 | 2/2016 |
| KR | 10-2399510 | 5/2022 |

* cited by examiner

*Primary Examiner* — Kenny A Cese
(74) *Attorney, Agent, or Firm* — KILE PARK REED & HOUTTEMAN PLLC

(57) ABSTRACT

The present disclosure relates to an image processing method for a multi-dimensional region of interest (ROI) in a wireless charging system. More specifically, the method includes determining whether a surveillance target exists in the multi-dimensional ROI by performing, regarding the surveillance target, the process of removing a false-alarm region and including an excluded ROI.

13 Claims, 6 Drawing Sheets

IMAGE PROCESSING METHOD OF MULTI-DIMENSIONAL REGION OF INTEREST IN WIRELESS CHARGING SYSTEM, AND COMPUTING APPARATUS PERFORMING THE METHOD

CROSS-REFERENCE TO RELATED APPLICATION

This application claims the benefit of Korean Patent Application No. 10-2023-0012124 filed on Jan. 30, 2023, in the Korean Intellectual Property Office, the entire disclosure of which is incorporated herein by reference for all purposes.

BACKGROUND

1. Field of the Invention

One or more embodiments relate to an image processing method, and more specifically, to a method of setting a multi-dimensional region of interest based on the multi-dimensionality of a charging space of a wireless charging system and detecting and processing a foreign object that may exist in a multi-dimensional region of interest.

2. Description of the Related Art

In general, a wireless charging system refers to a system for charging a battery at a receiving terminal by transmitting and receiving power through a power receiving coil and a power transmitting coil. A region between the power receiving coil and the power transmitting coil during charging is referred to as a charging space. When a foreign object such as metal, the human body, and the like appears in the charging space, it may cause a decrease in charging efficiency, ignition, and harmful effects on the human body.

To prevent these, the wireless charging system monitors the charging space and cuts off the power of the power transmitting coil when the appearance of a foreign object is detected in the charging space to secure the safety of the wireless charging system. To this end, the wireless charging system sets a region of interest (ROI), in which the appearance of a foreign object should be monitored in the charging space when processing the foreign object based on an image obtained through an imaging apparatus. However, the ROI needs to be reset every time the power transmitting coil and the power receiving coil are changed in the wireless charging system. In addition, since the ROI is configured in three dimensions, there is an aspect that a specific part of the ROI such as a false-alarm region or an excluded ROI may not be included in or removed from the ROI and thus an object intruding into the multi-dimensional ROI may not be detected.

SUMMARY

Embodiments provide a method of setting a charging space as a multi-dimensional region of interest (ROI) based on the multi-dimensionality of a charging space that may be formed between a transmitting coil and a receiving coil included in a wireless charging system and processing the multi-dimensional ROI on a plane image.

According to an aspect, there is provided an image processing method performed by a computing apparatus, the method including collecting, from a camera working with the computing apparatus, a plane image of a charging space to be monitored according to a surveillance angle of the camera, setting a multi-dimensional ROI on the collected plane image of the charging space for determining whether there is a surveillance target, when there is a surveillance target in the multi-dimensional ROI, determining a distance between the camera and the surveillance target on the plane image and an angle between a straight line from the camera onto the plane image and the surveillance target, and determining a surveillance target in the plane image by determining rectangular coordinates of the surveillance target on the plane image based on the distance and the angle.

The collecting of the plane image may include adjusting an exclusion ratio on the charging space using a surveillance angle of the camera with a front of the camera as a center and collecting a plane image in which the charging space is consecutively displayed according to the exclusion ratio.

The adjusting of the exclusion ratio may include adjusting the exclusion ratio of a surveillance range that may be set as a multi-dimensional ROI, by enlarging or reducing the surveillance angle of the camera.

The setting of the multi-dimensional ROI may include setting the multi-dimensional ROI including at least one of an essential ROI that is included in the surveillance range for generating the plane image or an excluded ROI that needs to be included in the surveillance range but is not monitored.

The setting of the multi-dimensional ROI may include setting the multi-dimensional ROI by distinguishing an unnecessary false-alarm region and an essential false-alarm region in an entire region of the multi-dimensional ROI from the essential ROI.

The determining of the angle may include determining the angle between the straight line from the camera onto the plane image and the surveillance target using an angle of view of the camera and a number of pixels on the plane image.

The determining the surveillance target may include determining rectangular coordinates including an x value and a y value of the surveillance target according to the distance and the angle based on a horizontal line and a vertical line on the plane image and determining the surveillance target that is included in the multi-dimensional ROI on the plane image based on the rectangular coordinates.

According to an aspect, there is provided a computing apparatus performing an image processing method, the computing apparatus including a processor configured to collect, from a camera working with the computing apparatus, a plane image of a charging space to be monitored according to a surveillance angle of the camera, set a multi-dimensional ROI on the collected plane image of the charging space for determining whether there is a surveillance target, when there is a surveillance target in the multi-dimensional ROI, determine a distance between the camera and the surveillance target on the plane image and an angle between a straight line from the camera onto the plane image and the surveillance target, and determine a surveillance target in the plane image by determining rectangular coordinates of the surveillance target on the plane image based on the distance and the angle.

The processor may be configured to adjust an exclusion ratio on the charging space using a surveillance angle of the camera with a front of the camera as a center and collect a plane image in which the charging space is consecutively displayed according to the exclusion ratio.

The processor may be configured to adjust the exclusion ratio of a surveillance range that may be set as a multi-dimensional ROI, by enlarging or reducing the surveillance angle of the camera.

The processor may be configured to set the multi-dimensional ROI including at least one of an essential ROI that is included in the surveillance range for generating the plane image or an excluded ROI that needs to be included in the surveillance range but is not monitored.

The processor may be configured to set the multi-dimensional ROI by distinguishing an unnecessary false-alarm region and an essential false-alarm region in an entire region of the multi-dimensional ROI from the essential ROI.

The processor may be configured to determine the angle between the straight line from the camera onto the plane image and the surveillance target using an angle of view of the camera and a number of pixels on the plane image.

The processor may be configured to determine rectangular coordinates including an x value and a y value of the surveillance target according to the distance and the angle based on a horizontal line and a vertical line on the plane image and determine the surveillance target that is included in the multi-dimensional ROI on the plane image based on the rectangular coordinates.

According to an embodiment, there is provided a wireless charging system including a computing apparatus configured to set an image-processing based multi-dimensional ROI based on a multi-dimensionality of a charging region that a foreign object may invade, and handle the set multi-dimensional ROI on a plane image and a camera that works with the computing apparatus and of which a surveillance range of the multi-dimensional ROI changes according to a surveillance angle, wherein the computing apparatus is configured to determine a presence or absence of a surveillance target in the multi-dimensional ROI and, according to the presence and absence of the surveillance target, determine a location of the surveillance target on the plane image.

The computing apparatus may be configured to collect a plane image of a charging space to be monitored according to a surveillance angle of the camera, set a multi-dimensional ROI on the collected plane image of the charging space for determining whether there is a surveillance target, when there is a surveillance target in the multi-dimensional ROI, determine a distance between the camera and the surveillance target on the plane image and an angle between a straight line from the camera onto the plane image and the surveillance target, and determine a surveillance target in the plane image by determining rectangular coordinates of the surveillance target on the plane image based on the distance and the angle.

The computing apparatus may be configured to adjust an exclusion ratio on the charging space using a surveillance angle of the camera with a front of the camera as a center and collect a plane image in which the charging space is consecutively displayed according to the exclusion ratio.

The computing apparatus may be configured to set the multi-dimensional ROI including at least one of an essential ROI that is included in the surveillance range for generating the plane image or an excluded ROI that needs to be included in the surveillance range but is not monitored.

The computing apparatus may be configured to determine the angle between the straight line from the camera onto the plane image and the surveillance target using an angle of view of the camera and a number of pixels on the plane image.

The computing apparatus may be configured to determine rectangular coordinates including an x value and a y value of the surveillance target according to the distance and the angle based on a horizontal line and a vertical line on the plane image and determine the surveillance target that is included in the multi-dimensional ROI on the plane image based on the rectangular coordinates.

Additional aspects of embodiments will be set forth in part in the description which follows and, in part, will be apparent from the description, or may be learned by practice of the disclosure.

According to an embodiment, a charging space may be set as a multi-dimensional ROI based on the multi-dimensionality of a charging space that may be formed between a transmitting coil and a receiving coil included in a wireless charging system and the multi-dimensional ROI may be processed on a plane image.

According to an embodiment, a surveillance target in the multi-dimensional ROI may be more accurately detected by setting the multi-dimensional ROI on the plane image and eliminating a false-alarm ratio, which inevitably occurs in existing technology.

According to an embodiment, it may be possible to improve the accuracy of detecting a surveillance target in a complex multi-dimensional ROI by dividing the multi-dimensional ROI into a false-alarm region and an excluded ROI.

According to an embodiment, it may be possible to expand technology by setting a multi-dimensional ROI in object detection technology using a plane image as well as the wireless charging system.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, embodiments will be described in detail with reference to accompanying drawings.

Figure 1:
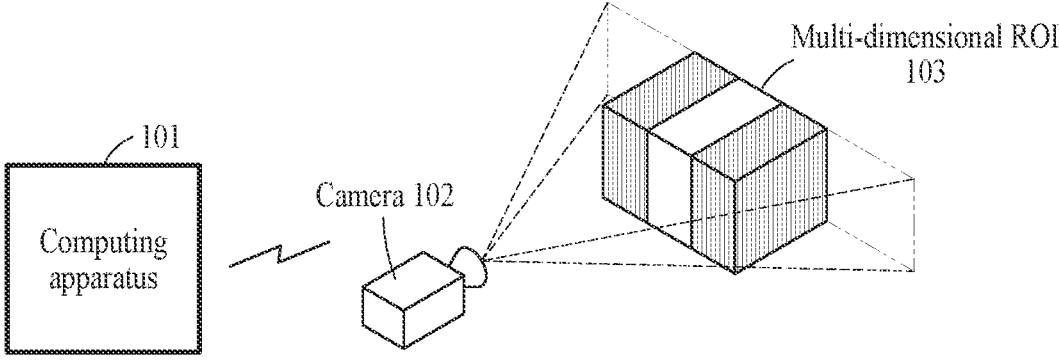
FIG. 1 is a diagram illustrating a wireless charging system for processing a multi-dimensional region of interest (ROI) on an image, according to an embodiment.

FIG. 1 is a diagram illustrating a wireless charging system for processing a multi-dimensional region of interest (ROI) on an image, according to an embodiment.

Referring to FIG. 1, a computing apparatus 101 may provide an image processing method for detecting, on a plane image, a foreign object that is in a charging space formed between a power receiving coil and a power transmitting coil of a wireless charging system. Specifically, the computing apparatus 101 may set the charging space that is formed in multi-dimensions in the wireless charging system as a multi-dimensional ROI 103 on a plane image. The computing apparatus 101 may determine whether there is a surveillance target in the multi-dimensional ROI 103 set on the plane image.

The computing apparatus 101 may collect a plane image that may be set as the multi-dimensional ROI 103 from a camera 102 that works with the computing apparatus 101. The computing apparatus 101 may monitor the multi-dimensional ROI 103 having different views according to a surveillance angle with the front of the camera as the center. The computing apparatus 101 may monitor the multi-dimensional ROI 103 having different views by adjusting an exclusion ratio of the charging space according to the surveillance angle.

The computing apparatus 101 may collect the monitored multi-dimensional ROI 103 as a plane image. In other words, the computing apparatus 101 may collect the multi-dimensional ROI 103 that changes according to the rate of change in time and the surveillance angle of the camera 102 as a consecutively displayed plane image. Here, the rate of change in time may refer to the speed displayed on each of successive unit still images in an image monitored through the camera 102, that is, a plane image.

The computing apparatus 101 may set the multi-dimensional ROI 103 on the collected plane image of the charging space for determining whether there is a surveillance target. When a surveillance target is in the multi-dimensional ROI 103, the computing apparatus 101 may determine a distance between the camera 102 and the surveillance target on the plane image and an angle between a straight line from the camera 102 onto the plane image and the surveillance target. The computing apparatus 101 may determine a surveillance target in the plane image by determining rectangular coordinates of the surveillance target on the plane image based on the distance and the angle.

In general, a wireless charging system needs to immediately detect a foreign object when the foreign object is in a charging space since a foreign object in a charging space may reduce charging efficiency or do harm to life. In the present disclosure, when a foreign object invades a charging space, the computing apparatus 101 may set and process a multi-dimensional ROI based on the multi-dimensionality of the charging space when detecting the foreign object based on image processing.

Figure 2:
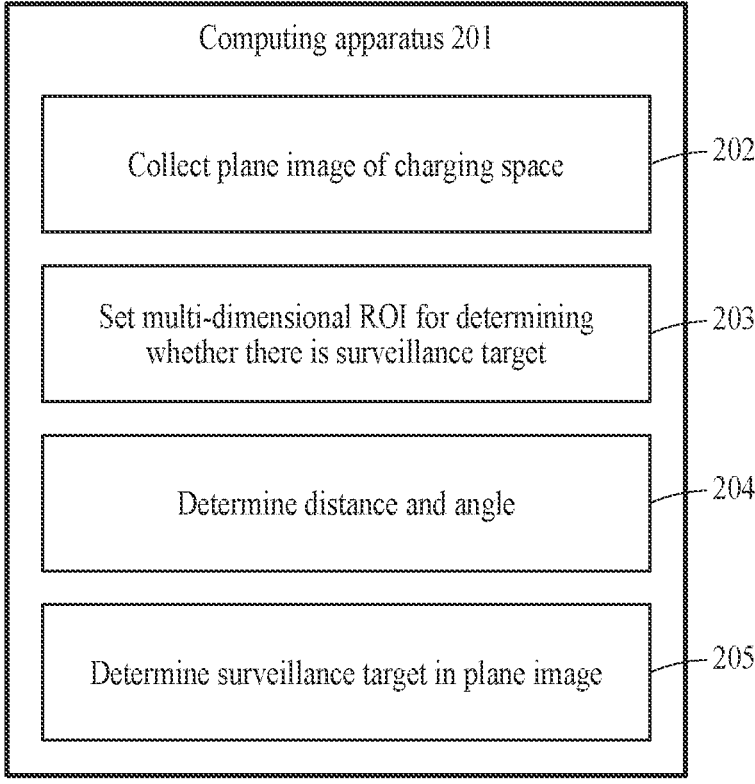
FIG. 2 is a diagram illustrating detailed operations of a processor included in a computing apparatus, according to an embodiment.

FIG. 2 is a diagram illustrating detailed operations of a processor included in a computing apparatus 201, according to an embodiment.

In operation 202, the computing apparatus 201 may collect, from a camera, a plane image of a charging space to be monitored according to a surveillance angle of the camera. The computing apparatus 201 may adjust an exclusion ratio on the charging space using the surveillance angle of the camera with the front of the camera as the center. The computing apparatus 201 may adjust the exclusion ratio of a surveillance range that may be set as a multi-dimensional ROI, by enlarging or reducing the surveillance angle of the camera. The computing apparatus 201 may collect a plane image in which the charging space is consecutively displayed according to the exclusion ratio.

In operation 203, the computing apparatus 201 may set a multi-dimensional ROI on the collected plane image of the charging space for determining whether there is a surveillance target. The computing apparatus 201 may set the multi-dimensional ROI including at least one of an essential ROI that is included in the surveillance range for generating the plane image or an excluded ROI that needs to be included in the surveillance range but is not monitored. Here, the computing apparatus 201 may set the multi-dimensional ROI by distinguishing an unnecessary false-alarm region and an essential false-alarm region in an entire region of the multi-dimensional ROI from the essential ROI.

When there is a surveillance target in the multi-dimensional ROI, the computing apparatus 201 may determine a distance between the camera and the surveillance target on the plane image and an angle between a straight line from the camera onto the plane image and the surveillance target in operation 204. The angle may be determined by an angle of view of the camera and the number of pixels on the plane image.

In operation 205, the computing apparatus 201 may determine a surveillance target in the plane image by determining rectangular coordinates of the surveillance target on the plane image based on the distance and the angle. The computing apparatus 201 may determine rectangular coordinates including an x value and a y value of the surveillance target according to the distance and the angle based on a horizontal line and a vertical line on the plane image. The computing apparatus 201 may determine the surveillance target that is included in the multi-dimensional ROI on the plane image based on the rectangular coordinates.

Figure 3:
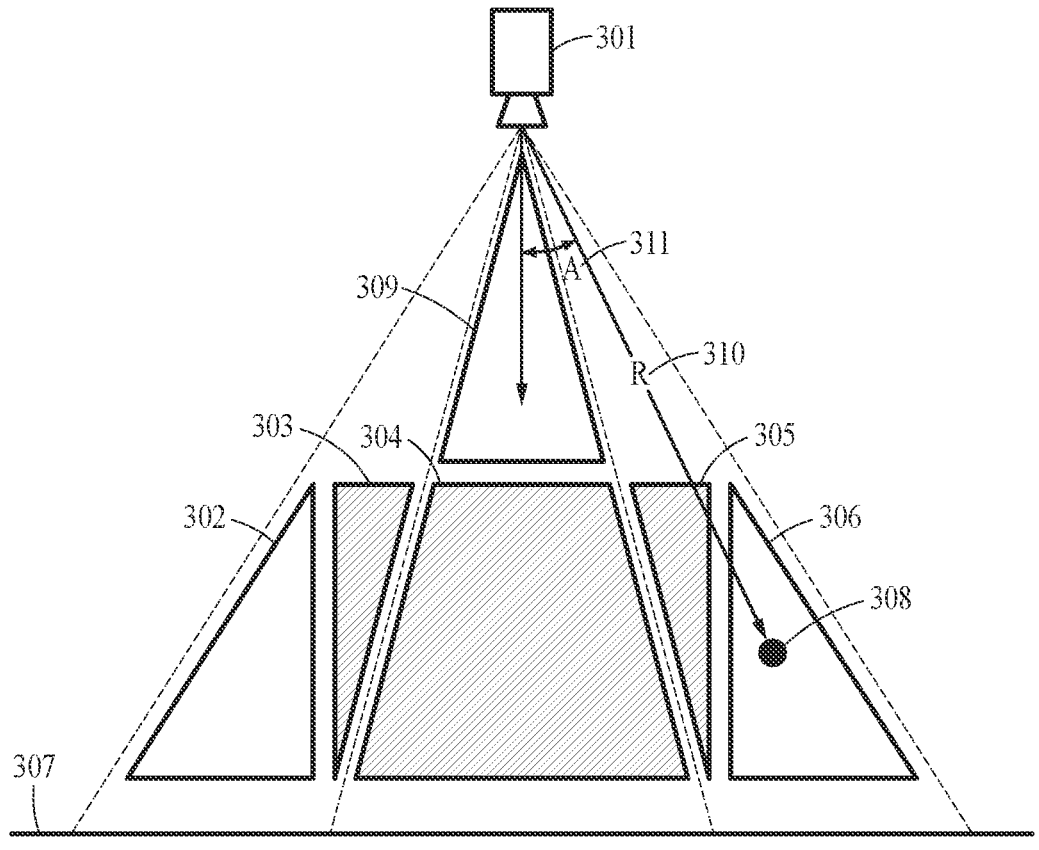
FIG. 3 is a diagram illustrating a process of setting a multi-dimensional ROI according to a surveillance angle of a camera, according to an embodiment.

FIG. 3 is a diagram illustrating a process of setting a multi-dimensional ROI according to a surveillance angle of a camera, according to an embodiment.

Referring to FIG. 3, the computing apparatus 101 may set a multi-dimensional ROI in a charging space to be monitored through a camera 301. Here, when setting the multi-dimensional ROI in the charging space, a phenomenon that occurs in the front (x-y plane) of the camera 301 may be equally established on the side (y-z plane). The phenomenon occurring in the front of the camera 301 may be a feature classified into a part that may be monitored and a part that is not possible to be monitored according to a perspective view considering the multi-dimensionality of the charging space. This may equally apply to the side.

Accordingly, the computing apparatus 101 may collect a plane image 307 of the multi-dimensional ROI that is in the charging space and that changes according to a surveillance angle 311 of the camera 301, with the front of the camera 301 as the center. The multi-dimensional ROI may be divided into an essential ROI 304 and excluded regions of interest 303 and 305. The essential ROI 304 may be a region included in a surveillance range according to the setting of the multi-dimensional ROI for generating a plane image. In addition, the excluded regions of interest 303 and 305 may be regions not included in the surveillance range according to the setting of the multi-dimensional ROI, which need to be included in the surveillance range but are not monitored.

In the present disclosure, the multi-dimensional ROI may be adjusted by controlling the surveillance angle of the camera 301 to include the excluded regions of interest 303 and 305. For example, the computing apparatus 101 may adjust the essential ROI 304 and the excluded regions of interest 303 and 305 according to an angle of view by enlarging or reducing the angle of view of the camera 301, since the surveillance angle of the camera 301 may be controlled at an interval of "1" degree.

Accordingly, the computing apparatus 101 may enlarge the surveillance angle of the camera 301 to include unnecessary false-alarm regions 302 and 306 in the multi-dimensional ROI in the surveillance range. The unnecessary false-alarm regions 302 and 306 may be regions that should not be included in the surveillance range but that are being monitored. However, enlarging the surveillance angle may also generate an essential false-alarm region 309 on the multi-dimensional ROI. Here, the essential false-alarm region 309 may be a region that should be monitored in order to monitor the essential ROI 304. Thus, the computing apparatus 101 may monitor the essential false-alarm region 309, which occurs in the process of monitoring the essential ROI 304, by separating the essential false-alarm region 309 from the essential ROI 304.

Finally, the computing apparatus 101 may determine a distance 310 (R) between the camera 301 and a surveillance target 308 and an angle 311 (A) between a straight line from the camera 301 onto the plane image 307 and the surveillance target, in order to monitor the essential ROI 304 and the excluded regions of interest 303 and 305 within the multi-dimensional ROI on the plane image 307.

The distance 310 (R) may be extracted through a stereo camera or an ultrasound sensor installed at the same location as the camera 301. The angle 311 (A) may be extracted using the angle of view of the camera 301 and the number of pixels on the plane image 307. The distance 310 (R) and the angle 311 (A) may be set as variables for the technical goal of the present disclosure.

Thereafter, the computing apparatus 101 may extract the essential ROI 304 and the excluded regions of interest 303 and 305 based on the distance 310 (R) and the angle 311 (A). The computing apparatus 101 may perform a method of separating and excluding the unnecessary regions of interest 302 and 306 and the essential false-alarm region 309 from the multi-dimensional ROI in the process of extracting the essential ROI 304 and the excluded regions of interest 303 and 305.

Figure 4:
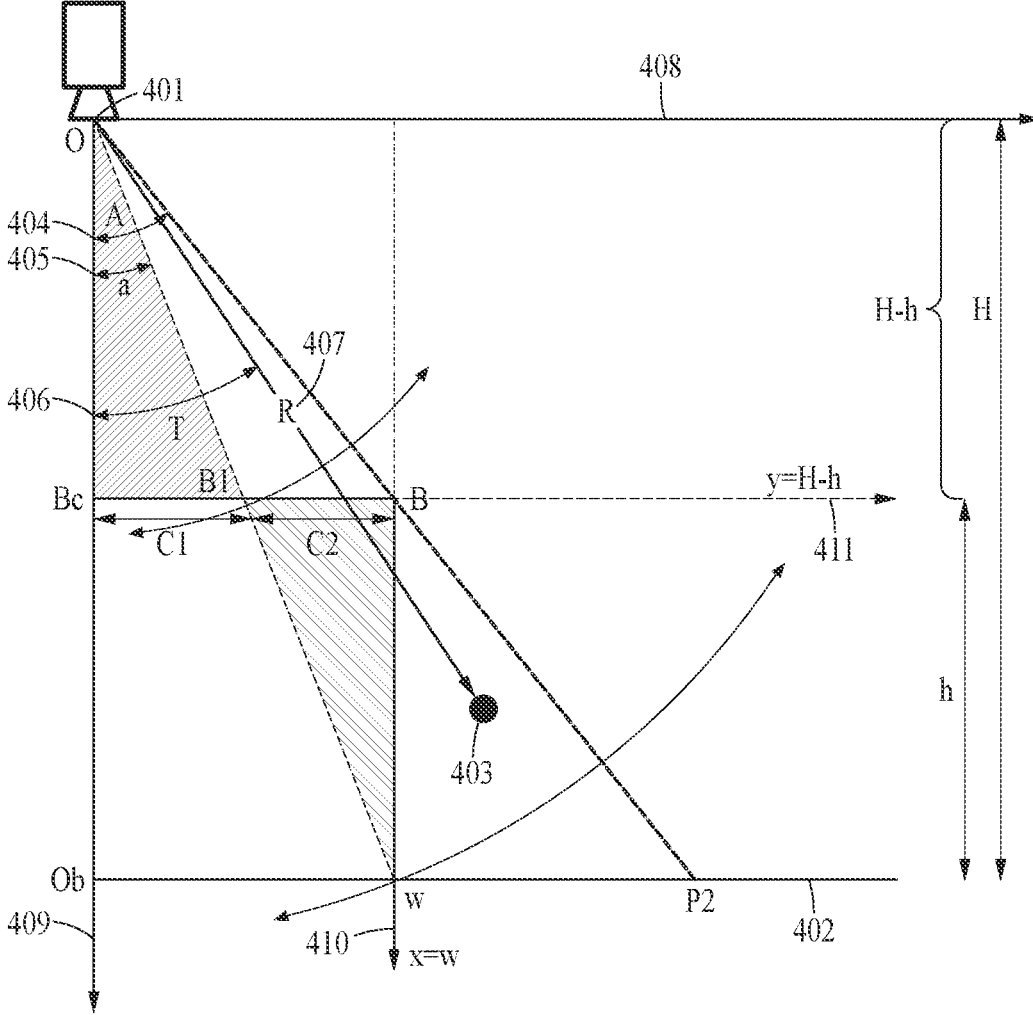
FIG. 4 is a diagram illustrating a relationship between each of dots in a multi-dimensional ROI, according to an embodiment.

FIG. 4 is a diagram illustrating a relationship between each of dots in a multi-dimensional ROI, according to an embodiment.

FIG. 4 illustrates the relationship between each of the dots of FIG. 3 in detail. Here, since FIG. 3 has a symmetrical shape, only the right side of the relationship is illustrated in FIG. 4.

Referring to FIG. 4, the multi-dimensional ROI of the present disclosure may be implemented as the shape of square formed by a dot Bc, a dot B, a dot Ob, and a dot w and an excluded ROI as opposed to the multi-dimensional ROI may be implemented as the shape of triangle formed by a dot B1, a dot B, and a dot w. A computing apparatus 101 may define a distance 407 (R) and an angle 406 (T, hereinafter referred to as an angle or a third angle) of a surveillance target 403 from an origin 401 as two variables, based on the multi-dimensional ROI and the excluded ROI.

The Excluded ROI

The excluded ROI may be implemented as the shape of triangle formed by the dot B1, the dot B, and the dot w. The computing apparatus 101 may evaluate the efficiency of the method of processing the multi-dimensional ROI proposed in the present disclosure by calculating a ratio of a region that is not monitored, that is, an exclusion ratio of the excluded ROI. The exclusion ratio may be defined by a total ratio corresponding to the multi-dimensional ROI and a partial ratio corresponding to the excluded ROI and may be represented as Equation 1 below.

$$\text{Exclusion ratio} = \frac{\text{Excluded } ROI}{\text{Multi-dimensional } ROI} = \qquad \text{[Equation 1]}$$

$$\frac{\text{Triangle } B1, B2, w}{\text{Rectangle } Bc, B, Ob, w} = \frac{h}{2H}$$

The exclusion ratio may be a ratio designed based on a trigonometric function. Here, a triangle formed by the dots B1, B, and w (the excluded ROI) may be implemented as a congruent figure having a facing angle of the same size as the facing angle of a triangle formed by the dots B1, Bc, and O.

The Excluded ROI and the False-Alarm Region

The computing apparatus 101 may check whether there is the surveillance target 403 in the entire range of the multi-dimensional ROI to additionally monitor the excluded ROI. Specifically, the computing apparatus 101 may use a condition for detecting the surveillance target 403 based on a horizontal line 408 and a vertical line 409 on a plane image 402. For example, the computing apparatus 101 may be classified into a first angle 404 (A), a second angle 405 ($a$), and a third angle 406 (T). A plurality of conditions for detecting the surveillance target 403 may be as follows.

1. A First Condition (T≤α)

The first condition is a condition that the third angle 406 (T) is less than or equal to the second angle 405 ($a$), and whether the false-alarm region is included may be determined according to the distance 407 (R) of the surveillance target 403.

2. A Second Condition (α<T≤A)

The second condition is a condition that the third angle 406 (T) is less than or equal to the first angle 404 (A) and greater than the second angle 405 ($a$), and whether the excluded ROI is included may be determined according to the distance 407 (R) of the surveillance target 403.

3. A Third Condition (A<T)

The third condition is a condition that the third angle 406 (T) is greater than the first angle 404 (A). Here, all surveillance targets may not be included in the multi-dimensional ROI.

Here, in the third condition, whether the surveillance target 403 is included in the multi-dimensional ROI may be determined only based on the angle of the surveillance target 403. However, in the first condition and the second condition, that is, in the false-alarm region (T≤α) and the excluded ROI (α<T≤A), whether the surveillance target 403 is included in the multi-dimensional ROI may be found using variables other than the angles such as the first angle 404 (A), the second angle 405 ($a$), and the third angle 406 (T).

In addition, in order to determine coordinates of the horizontal line 408 and the vertical line 409, an x-coordinate and a y-coordinate may be derived using a polar coordinates-rectangular coordinates transformation. More specifically, the computing apparatus 101 may represent the surveillance target 403 as a dot on coordinates on a plane defined by the origin 401 (the dot O), the x-axis 408, and the y-axis 409. For example, the x-axis may be represented as 408 of FIG. 4 and the y-axis may be represented as 409 of FIG. 4. The above may be represented as a quadrant based on the origin 401. In the case of the polar coordinate system, the x-axis may represent + and the y-axis may represent − and in the complex number coordinate system, the x-axis may represent real numbers + and the y-axis may represent −j imaginary numbers (−).

The x-coordinate and y-coordinate of the surveillance target 403 may be represented as in Equation 2 below.

$$x = R\sin(T) \qquad \text{[Equation 2]}$$

$$y = R\cos(T)$$

In addition, the computing apparatus 101 may represent the surveillance target 403 as a dot on a complex number plane defined by the origin 401 (the dot O), a real axis 408, and an imaginary axis 409 as in Equation 3 below. For reference, since the third angle 406 (T) may be an angle from a real number axis 412 (0°), the 0° ~ 270° part may be additionally performed in the calculation process.

Accordingly, the surveillance target 403 may be represented as a complex number "z" on a complex plane using two variables of the distance 407 (R) and the third angle 406 (T) and the complex number "z" may be represented as Equation 3 below.

$$z = \mathrm{Re}^{jT} = x + jy \qquad \text{[Equation 3]}$$

In Equation 4, x=real(z) and y=imag(z) respectively are a real part and an imaginary part of the complex number "z" and may be represented as $j=\sqrt{-1}$.

The computing apparatus 101 may represent the excluded ROI using variables of the distance 407 (R), the third angle 406 (T), the x-axis 412, and a y-axis 413 based on Equations 2 and 3 above. The excluded ROI may be derived from the intersection of conditions of T, x, and y as in Equation 4 below.

$$a < T \leq A \cap x \leq w \cap y \leq H - h \qquad \text{[Equation 4]}$$

Here, selecting a region having a smaller y value may be because the y-axis is defined in a negative region. Here, since the y-axis is in the fourth quadrant, as a value goes downward from the origin 401 (O), the value may represent a smaller value, that is, a negative sign. Thus, the region having a smaller y value may be defined as a region having a negative sign.

Referring to Equation 4, since the line connecting the line segment Bc-B of FIG. 4 has a value of y=H–h, the y value less than thereof may be represented as the last set of Equation 4. That is, a value in the direction of the line segment Ob-w may be represented based on the line segment Bc-B.

In addition, the false-alarm region may be derived from the intersection of conditions of T and y as in Equation 5 below.

$$T \leq a \cap y \leq H - h \qquad \text{[Equation 5]}$$

In other words, the false-alarm region may be represented as a triangle O-Bc-B1. To represent the triangle O-Bc-B1, the angle may need to be included in the second angle 405 (a) based on the origin 401 (O). For the y value, y=H–h connecting the line segment Bc-B with a negative sign from "0" may be represented as in Equation 5.

Figure 5:
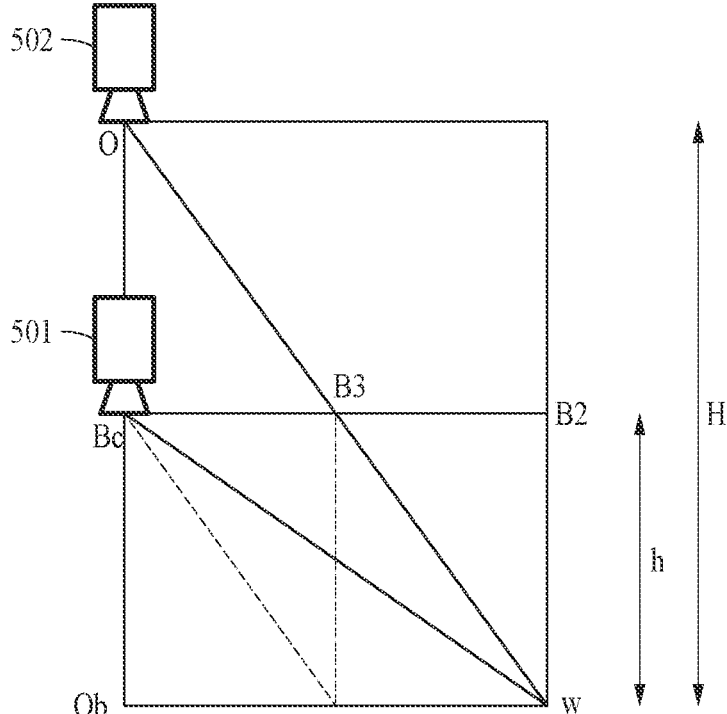
FIG. 5 is a diagram illustrating a change in an exclusion ratio of a multi-dimensional ROI according to a location of a camera, according to an embodiment.

FIG. 5 is a diagram illustrating a change in an exclusion ratio of a multi-dimensional ROI according to a location of a camera, according to an embodiment.

Referring to FIG. 5, the computing apparatus 101 may not be able to detect a surveillance target when the location of a camera 501 related to the exclusion ratio is on the position of a dot Bc. For example, when the exclusion ratio between the camera 501 and the dot Bc is H=h, the computing apparatus 101 may have a 50% probability that the surveillance target in the multi-dimensional ROI may not be detected. In addition, the computing apparatus 101 may not be able to detect the surveillance target when the location of the camera 501 is at a height twice the height h of the multi-dimensional ROI. For example, when the exclusion ratio between the camera 501 and the dot Bc is H=2 h, the computing apparatus 101 may have a 25% probability that the surveillance target in the multi-dimensional ROI may not be detected. In conclusion, the exclusion ratio for detecting a surveillance target of the computing apparatus 101 may vary depending on the location of the camera 501.

In addition, the computing apparatus 101 may define an angle between a center line of the camera and an end point w of the base of the multi-dimensional ROI as "a" and a false-alarm ratio may be detected through the "a." The false-alarm ratio may be represented as in Equation 6 below.

$$\text{Exclusion ratio} = \frac{\text{Excluded } ROI}{\text{Multi-dimensional } ROI} = \qquad \text{[Equation 6]}$$

$$\frac{\text{Triangle } B1, B2, w}{\text{Rectangle } Bc, B, Ob, w} = \frac{h}{2H}$$

The false-alarm ratio may be a rate designed based on a trigonometric function. Here, when the location of the camera 501 is on the position of the dot Bc, that is, when H=h, the false-alarm ratio may indicate 0%. This may be because the camera 501 is in a space (or above) adjacent to the multi-dimensional ROI and thus there is no false-alarm region. In addition, when the location of a camera 502 is at a height twice the height h of the multi-dimensional ROI, that is, when H=2 h, the false-alarm ratio may be represented as 25%.

Accordingly, since the height of the camera 501 of a wireless charging system may be a factor that increases the size of the corresponding system, considering that the camera 501 is installed at a height close to the detection location, the height of the camera 501 proposed in the present disclosure may be within the range from right above the multi-dimensional ROI to twice the height of the multi-dimensional ROI.

In conclusion, in the corresponding range, the exclusion ratio may be 50~25% and the false-alarm ratio may be 0~25%. Thus, when the multi-dimensional ROI is monitored using existing technology, there may be a 44~50% probability of false detection, wherein the value of 44~50% is the sum of these two ratios. The technology proposed by the present disclosure may eliminate such a false detection ratio.

Figure 6:
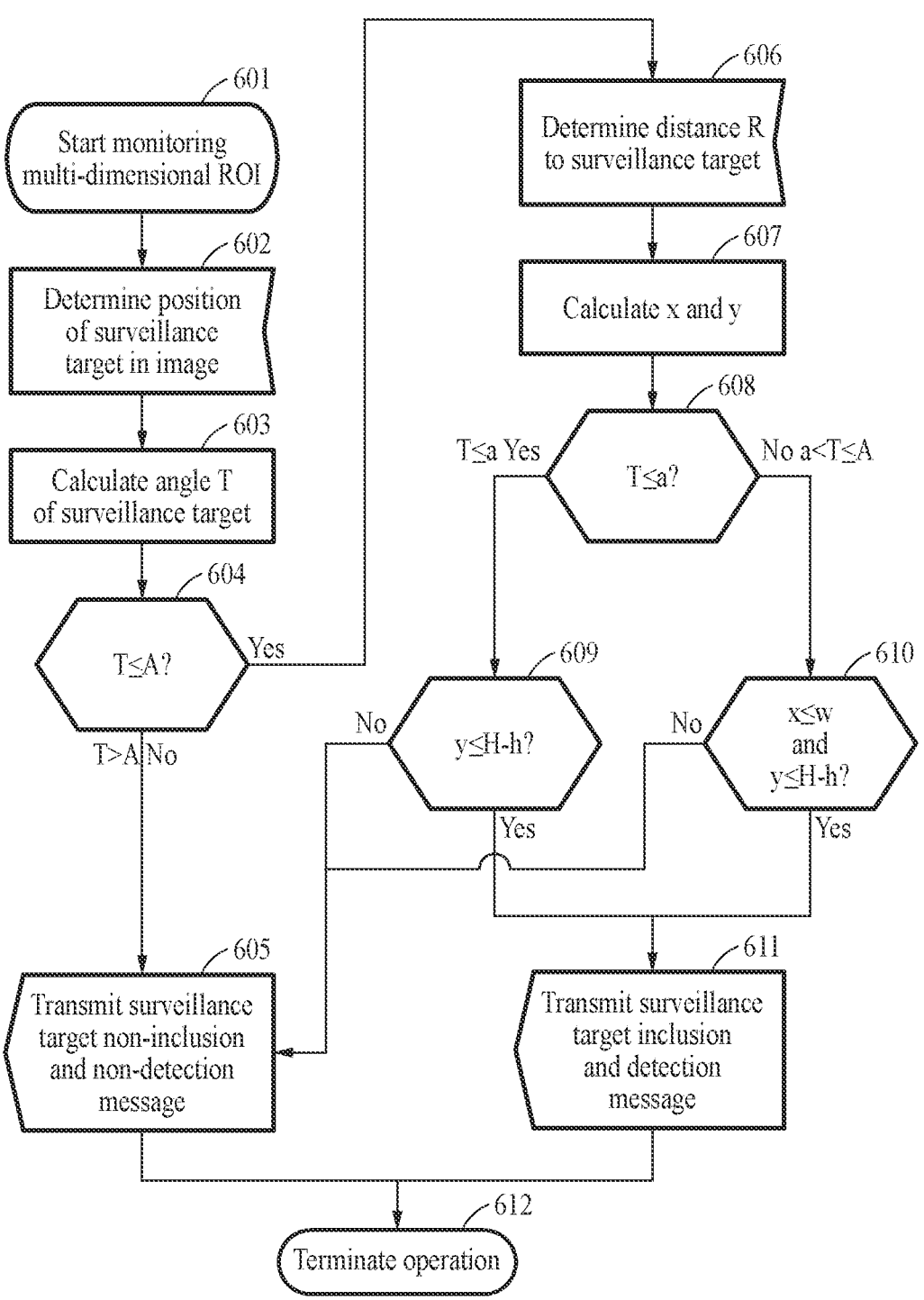
FIG. 6 is a flowchart illustrating a process of detecting a surveillance target in the multi-dimensional ROI, according to an embodiment.

FIG. 6 is a flowchart illustrating a process of detecting a surveillance target in the multi-dimensional ROI, according to an embodiment.

Referring to FIG. 6, the computing apparatus 101 may determine whether a surveillance target is included in a multi-dimensional ROI according to a mathematical relationship based on an excluded ROI and a false-alarm region. In other words, the computing apparatus 101 may determine whether the surveillance target exists regardless of the location of a plane image by comparing and analyzing a previous frame and a current frame among successive image frames of the plane image. In other words, the computing apparatus 101 may perform a process of checking whether the surveillance target is included in the multi-dimensional ROI.

In operation 601, the computing apparatus 101 may monitor the multi-dimensional ROI through a camera capable of working with the computing device 101.

In operation 602, the computing apparatus 101 may check whether the surveillance target exists in the entire region of the plane image including the monitored multi-dimensional ROI. When the surveillance target exists within the entire region of the plane image, the computing apparatus 101 may determine the position of the surveillance target on the plane image.

In operation 603, the computing apparatus 101 may calculate an angle T between a straight line from the camera 301 onto the plane image 307 and the surveillance target and perform a determination process according to the calculated angle T.

In operation 604, the computing apparatus 101 may check whether the condition T≤A proposed in the present disclosure is satisfied.

When the condition is not satisfied (No) in operation 604, this corresponds to T>A and thus the computing apparatus 101 may detect that all surveillance targets are not included in the multi-dimensional ROI in operation 605 and may transmit a surveillance target non-detection message to a user terminal according to circumstances.

When the condition is satisfied (Yes) in operation 604, the computing apparatus 101 may determine a distance to the surveillance target in operation 606.

In operation 607, the computing apparatus 101 may calculate an x value and a y value, which are rectangular coordinates of the surveillance target, based on the angle determined in operation 603 and the distance determined in operation 606.

In operation 608, the computing apparatus 101 may determine whether the condition T≤α is satisfied using the x value and the y value.

When the condition is satisfied (Yes) in operation 608, since the condition T≤α is satisfied, the computing apparatus 101 may check whether a condition (y≤H–h) for removing a false-alarm region is satisfied in operation 609. When the condition (y≤H–h) is not satisfied (No) in operation 609, the computing apparatus 101 may perform operations in operation 605. In other words, as the computing apparatus 101 may determine an inclusion of the surveillance target in the false-alarm region, when the surveillance target is included in the false-alarm region (No) in operation 609, the computing apparatus 101 may determine that the surveillance target is not included in the multi-dimensional ROI according to the operations in operation 605.

When the surveillance target is not included in the false-alarm region (Yes) in operation 609, the computing apparatus 101 may determine that the surveillance target is included in the multi-dimensional ROI and transmit a detection message indicating that the surveillance target has been detected in the multi-dimensional ROI to the user terminal in operation 611.

On the other hand, when the condition T≤α is not satisfied (No) in operation 608, this corresponds to α<T≤A and thus the computing apparatus 101 may check whether the condition X≤W or y≤H–h is satisfied in operation 610. In other words, the computing apparatus 101 may check whether the surveillance target is included in the excluded ROI according to a determination whether the surveillance target is included in the multi-dimensional ROI in order to include the excluded ROI.

When the region in which the surveillance target is included is not confirmed as the excluded ROI (No) in operation 610, the computing apparatus 101 may determine that the surveillance target is not included in the multi-dimensional ROI according to operations in operation 605.

On the other hand, when the region is confirmed as the excluded ROI (Yes) in operation 610, the computing apparatus 101 may determine that the surveillance target is included in the multi-dimensional ROI and transmit a detection message indicating that the surveillance target has been detected in the multi-dimensional ROI to the user terminal in operation 611.

The determination and message transmission may be completed in operations 605 and 611. In operation 612, the computing apparatus 101 may terminate the determination of image frames included in the plane image and stand by for a call for next image frames.

In conclusion, when a surveillance target is detected in the entire plane image, the computing apparatus 101 may remove a false-alarm region for the surveillance target and proceed with a process of including an excluded ROI to determine whether the surveillance target exists within the multi-dimensional ROI. Accordingly, the computing apparatus 101 may eliminate a false detection ratio, which may not be performed with existing technology, and more accurately detect a foreign object.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The method according to embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific embodiments, the details should not be construed as limiting any invention or a scope that can be claimed, but rather should be construed as being descriptions of features that may be peculiar to specific embodiments of specific inventions. Specific features described in the present specification in the context of individual embodiments may be combined and implemented in a single embodiment. On the contrary, various features described in the context of a single embodiment may be implemented in a plurality of embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned embodiments is required for all the embodiments, and it should be understood that the aforementioned program components and apparatuses may be integrated into a single software product or packaged into multiple software products.

The embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed embodiments, can be made.

What is claimed is:

1. An image processing method performed by a computing apparatus, the method comprising:
   collecting, from a camera working with the computing apparatus, a plane image of a charging space to be monitored according to a surveillance angle of the camera;
   setting a multi-dimensional region of interest (ROI) on the collected plane image of the charging space for determining whether there is a surveillance target;
   when there is a surveillance target in the multi-dimensional ROI, determining a distance between the camera and the surveillance target on the plane image and an angle between a straight line from the camera onto the plane image and the surveillance target; and determining a surveillance target in the plane image by determining rectangular coordinates of the surveillance target on the plane image based on the distance and the angle,
   wherein the collecting of the plane image comprises:
      adjusting an exclusion ratio on the charging space using a surveillance angle of the camera with a front of the camera as a center; and
      collecting a plane image in which the charging space is consecutively displayed according to the exclusion ratio.

2. The method of claim 1, wherein the adjusting of the exclusion ratio comprises adjusting the exclusion ratio of a surveillance range that may be set as a multi-dimensional ROI, by enlarging or reducing the surveillance angle of the camera.

3. The method of claim 1, wherein the setting of the multi-dimensional ROI comprises setting the multi-dimensional ROI comprising at least one of an essential ROI that is included in the surveillance range for generating the plane image or an excluded ROI that needs to be included in the surveillance range but is not monitored.

4. The method of claim 3, wherein the setting of the multi-dimensional ROI comprises setting the multi-dimensional ROI by distinguishing an unnecessary false-alarm region and an essential false-alarm region in an entire region of the multi-dimensional ROI from the essential ROI.

5. The method of claim 1, wherein the determining the surveillance target comprises:
   determining rectangular coordinates comprising an x value and a y value of the surveillance target according to the distance and the angle based on a horizontal line and a vertical line on the plane image; and
   determining the surveillance target that is included in the multi-dimensional ROI on the plane image based on the rectangular coordinates.

6. A computing apparatus performing an image processing method, the computing apparatus comprising:
   a processor configured to collect, from a camera working with the computing apparatus, a plane image of a charging space to be monitored according to a surveillance angle of the camera, set a multi-dimensional region of interest (ROI) on the collected plane image of the charging space for determining whether there is a surveillance target, when there is a surveillance target in the multi-dimensional ROI, determine a distance between the camera and the surveillance target on the plane image and an angle between a straight line from the camera onto the plane image and the surveillance target, and determine a surveillance target in the plane image by determining rectangular coordinates of the surveillance target on the plane image based on the distance and the angle,
   wherein the processor is configured to:
      adjust an exclusion ratio on the charging space using a surveillance angle of the camera with a front of the camera as a center; and
      collect a plane image in which the charging space is consecutively displayed according to the exclusion ratio.

7. The computing apparatus of claim 6, wherein the processor is configured to adjust the exclusion ratio of a surveillance range that may be set as a multi-dimensional ROI, by enlarging or reducing the surveillance angle of the camera.

8. The computing apparatus of claim 6, wherein the processor is configured to set the multi-dimensional ROI comprising at least one of an essential ROI that is included in the surveillance range for generating the plane image or an excluded ROI that needs to be included in the surveillance range but is not monitored.

9. The computing apparatus of claim 8, wherein the processor is configured to set the multi-dimensional ROI by distinguishing an unnecessary false-alarm region and an essential false-alarm region in an entire region of the multi-dimensional ROI from the essential ROI.

10. The computing apparatus of claim 6, wherein the processor is configured to:

determine rectangular coordinates comprising an x value and a y value of the surveillance target according to the distance and the angle based on a horizontal line and a vertical line on the plane image; and determine the surveillance target that is included in the multi-dimensional ROI on the plane image based on the rectangular coordinates.

11. A wireless charging system comprising:

a computing apparatus configured to set an image-processing based multi-dimensional region of interest (ROI) based on a multi-dimensionality of a charging region that a foreign object may invade, and handle the set multi-dimensional ROI on a plane image; and a camera that works with the computing apparatus and of which a surveillance range of the multi-dimensional ROI changes according to a surveillance angle, wherein the computing apparatus is configured to determine a presence or absence of a surveillance target in the multi-dimensional ROI and, according to the presence and absence of the surveillance target, determine a location of the surveillance target on the plane image, wherein the computing apparatus is configured to:

collect a plane image of a charging space to be monitored according to a surveillance angle of the camera;

set a multi-dimensional ROI on the collected plane image of the charging space for determining whether there is a surveillance target;

when there is a surveillance target in the multi-dimensional ROI, determine a distance between the camera and the surveillance target on the plane image and an angle between a straight line from the camera onto the plane image and the surveillance target; and determine a surveillance target in the plane image by determining rectangular coordinates of the surveillance target on the plane image based on the distance and the angle, and wherein the computing apparatus is configured to:

adjust an exclusion ratio on the charging space using a surveillance angle of the camera with a front of the camera as a center; and collect a plane image in which the charging space is consecutively displayed according to the exclusion ratio.

12. The wireless charging system of claim 11, wherein the computing apparatus is configured to set the multi-dimensional ROI comprising at least one of an essential ROI that is included in the surveillance range for generating the plane image or an excluded ROI that needs to be included in the surveillance range but is not monitored.

13. The wireless charging system of claim 11, wherein the computing apparatus is configured to:

determine rectangular coordinates comprising an x value and a y value of the surveillance target according to the distance and the angle based on a horizontal line and a vertical line on the plane image; and determine the surveillance target that is included in the multi-dimensional ROI on the plane image based on the rectangular coordinates.

* * * * *